United States Patent
Yu et al.

(10) Patent No.: US 12,027,683 B1
(45) Date of Patent: Jul. 2, 2024

(54) RECOVERY PROCESSING METHOD FOR SPENT BATTERY ELECTRODE PLATE

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); YICHANG BRUNP RECYCLING TECHNOLOGY CO., LTD., Yichang (CN)

(72) Inventors: Haijun Yu, Foshan (CN); Jialei Xu, Foshan (CN); Yinghao Xie, Foshan (CN); Benben Wu, Foshan (CN); Jiangdong Chen, Foshan (CN); Changdong Li, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); YICHANG BRUNP RECYCLING TECHNOLOGY CO., LTD., Yichang (CN)

( * ) Notice: Subject to any disclaimer, the term of this patent is extended or adjusted under 35 U.S.C. 154(b) by 0 days.

(21) Appl. No.: 18/558,187

(22) PCT Filed: Aug. 12, 2022

(86) PCT No.: PCT/CN2022/112236
§ 371 (c)(1),
(2) Date: Oct. 30, 2023

(87) PCT Pub. No.: WO2023/087807
PCT Pub. Date: May 25, 2023

(30) Foreign Application Priority Data

Nov. 19, 2021 (CN) .......................... 202111374086.0

(51) Int. Cl.
*H01M 10/54* (2006.01)
*C08K 3/08* (2006.01)
(Continued)

(52) U.S. Cl.
CPC ............... *H01M 10/54* (2013.01); *C08K 3/08* (2013.01); *C22B 1/24* (2013.01);
(Continued)

(58) Field of Classification Search
None
See application file for complete search history.

(56) References Cited

U.S. PATENT DOCUMENTS 5,972,531 A 10/1999 Kawakami

FOREIGN PATENT DOCUMENTS

| CN | 101944644 A | 1/2011 |
| CN | 104485492 A | 4/2015 |

(Continued)

OTHER PUBLICATIONS

International Search Report issued for the PCT application No. PCT/CN2022/112236 on Oct. 26, 2022.
(Continued)

*Primary Examiner* — Carlos Barcena
(74) *Attorney, Agent, or Firm* — Buchalter; Jason W. Croft

(57) ABSTRACT

Disclosed is a method for recovering and processing a retired battery electrode plate. The method includes disassembling a retired battery to obtain an electrode plate, energizing two ends of the electrode plate until a binder on the electrode plate is heated and melted, and then separating out an electrode material and a current collector, and when the electrode plate is a negative electrode plate, ball milling the separated electrode material, winnowing the ball-milled material to obtain graphite, subjecting the graphite to an (Continued)

alkali treatment, adding the graphite, which has been subjected to the alkali treatment, and an aggregate to softened asphalt, and stirring same to obtain conductive asphalt. The two ends of the electrode are energized, such that the binder is melted into liquid to flow out of the current collector, and the electrode material is stripped off the electrode plate.

12 Claims, 2 Drawing Sheets

(51) Int. Cl.
*C22B 1/24* (2006.01)
*H01M 4/505* (2010.01)
*H01M 4/525* (2010.01)
*H01M 4/58* (2010.01)
*H01M 10/0525* (2010.01)
*H01M 4/02* (2006.01)

(52) U.S. Cl.
CPC ............... *C08K 2003/0818* (2013.01); *C08K 2201/001* (2013.01); *C08K 2201/005* (2013.01); *H01M 2004/028* (2013.01); *H01M 4/505* (2013.01); *H01M 4/525* (2013.01); *H01M 4/5825* (2013.01); *H01M 10/0525* (2013.01)

(56) References Cited

FOREIGN PATENT DOCUMENTS

| | | |
|---|---|---|
| CN | 114243140 A | 3/2022 |
| DE | 102011110083 A1 | 2/2013 |

OTHER PUBLICATIONS

Written Opinion issued for the PCT application No. PCT/CN2022/112236 on Oct. 26, 2022.

RECOVERY PROCESSING METHOD FOR SPENT BATTERY ELECTRODE PLATE

CROSS-REFERENCE TO RELATED APPLICATION

This application is a national stage filing under 35 U.S.C. § 371 of international application number PCT/CN2022/112236, filed Aug. 12, 2022, which claims priority to Chinese patent application No. 202111374086.0, filed Nov. 19, 2021. The contents of these applications are incorporated herein by reference in their entirety.

TECHNICAL FIELD

The present disclosure relates to the field of waste lithium ion battery recycling technologies, and particularly relates to recycling an electrode plate of a decommissioned battery.

BACKGROUND

Lithium ion batteries have the advantages of high specific energy, long cycle life, wide working temperature range and no memory effect, and become the main force in the new energy industry. The lithium ion battery industry is developing rapidly and the output of lithium ion batteries is ever-increasing. However, the service lives of the lithium ion batteries are 3 years to 8 years, and the decommissioned lithium ion batteries are rich in metal resources. Therefore, in recent years, lithium ion battery recycling enterprises have also been established accordingly. The rational utilization of the lithium ion battery resources has become the focus of research.

Currently, enterprises in and out of China mainly recycle batteries by pyrometallurgy recycling and hydrometallurgy recycling. Pyrometallurgy recycling recycles metal materials in the batteries through high temperature. This method can recycle valuable metals, while graphite is burned and oxidized, which not only causes waste but also generates a large amount of waste gas. This method consumes a lot of energy, while hydrometallurgy recycling has high recovery rate and simple process, but also generates a large amount of waste water. Moreover, graphite and waste residues are not completely separated, and the recycling efficiency is low. At present, the enterprises out of China mainly recycle batteries by pyrometallurgy recycling, while the enterprises in China mainly recycle batteries by hydrometallurgy recycling. When the metal materials with high values are extracted, most manufacturers bury or incinerate the graphite slag wastes, resulting in waste of resources. Reusing the graphite materials in the lithium ion batteries can effectively reduce carbon emissions. Some researchers reprocess the graphite and then apply the graphite to lithium ion batteries, but the reprocessed graphite has a large specific surface area, which not only leads to low initial charge-discharge efficiency but also consumes more electrolyte, and the recycling effect is general.

SUMMARY

The present disclosure aims at solving at least one of the above-mentioned technical problems. Therefore, the present disclosure provides a method for recycling an electrode plate of a decommissioned battery, which can effectively separate an electrode material from a current collector and realizes degradation and utilization of graphite, and improve a recycling rate of the graphite.

According to one aspect of the present disclosure, a method for recycling an electrode plate of a decommissioned battery is proposed, including the following steps of:

S1: disassembling a decommissioned battery to obtain an electrode plate, electrifying both ends of the electrode plate until a binder on the electrode plate is heated and melted, and then separating out an electrode material and a current collector; the decommissioned battery being discharged before disassembling;

S2: when the electrode plate is a negative plate, ball-milling the separated electrode material, winnowing the ball-milled material to obtain graphite, and treating the graphite with alkali; and S3: adding the alkali-treated graphite in step S2 and an aggregate into softened asphalt, and stirring to obtain conductive asphalt.

The principle of electrifying for heating in step S1 is based on the fact that internal resistances of the positive and negative electrode plates mainly come from the electrode material and an interface resistance between the electrode material and a metal foil. The resistance of the positive plate reaches 2.5Ω and the resistance of the negative plate reaches 0.8Ω, while the resistivity of the copper foil reaches $1.75 \times 10^{-8}$ and the resistivity of the aluminum reaches $2.9 \times 10^{-8}$. It can be obtained through a formula that the resistances of the copper foil and the aluminum foil are both less than 0.1 mΩ, and can be ignored. Therefore, the resistances of the positive and negative plates mainly come from the electrode material, the binder, an interface resistance between the material and the binder, and an interface resistance between an active substance and the metal foil. Therefore, according to a heat formula that $Q=I^2Rt$, it can be known that under a fixed current, the greater the resistance is, the higher the calorific value is. Therefore, the heating of the electrode plate is mainly concentrated in the part of the electrode material.

Because the graphite is mostly natural graphite coated with carbon by asphalt and resin and has a lower carbonization temperature, which will have some surface functional groups of —OH and —COOH, so the graphite needs to be treated with alkali to make the graphite close to a pH value of the asphalt, thus improving a service life of the conductive asphalt.

The density of the graphite in the ball-milled material is 2.21 g/cm$^3$ to 2.26 g/cm$^3$, and a density of the binder polyvinylidene fluoride (PVDF) ranges from 1.77 g/cm$^3$ to 1.80 g/cm$^3$. A density difference between the graphite and the PVDF is used for separation by a winnowing method. Moreover, the particle size of the ball-milled graphite is further reduced, which is conducive for the subsequent uniform dispersion of the graphite in the asphalt.

In some embodiments of the present disclosure, in step S1, when the electrode plate is a positive plate, the electrode material is one of lithium nickel cobalt manganese oxide, lithium iron phosphate, lithium cobalt oxide or lithium manganate.

In some embodiments of the present disclosure, in step S1, the power supply for the electrifying has a voltage of 12 V to 72 V and a current of 1 A to 5 A. Preferably, the power supply for the electrifying has a voltage of 36 V and a current of 1 A.

In some embodiments of the present disclosure, where in step S1, a temperature for the heating and melting ranges from 180° C. to 250° C. Further preferably, the temperature for the heating and melting is 200° C.

In some embodiments of the present disclosure, in step S1, the electrifying lasts for 10 minutes to 60 minutes. Further preferably, the electrifying lasts for 10 minutes.

In some embodiments of the present disclosure, in step S2, the alkali used in the alkali treatment has a concentration of 0.1 mol/L to 1 mol/L. Preferably, the alkali used in the alkali treatment has a concentration of 0.1 mol/L.

In some embodiments of the present disclosure, in step S2, the ball-milled material has a particle size of 11 μm to 18 μm. This size can ensure a compaction density in graphite recycling.

In some embodiments of the present disclosure, in step S2, a horizontal winnower mill is selected for the winnowing to separate the materials at a rotating speed of 900 r/min to 1,100 r/min, where the material near the horizontal winnower mill is the graphite and the material far from the horizontal winnower mill is PVDF.

In some embodiments of the present disclosure, in step S2, the alkali used in the alkali treatment is one or more of sodium hydroxide, potassium hydroxide, aqueous ammonia, quaternary ammonium base or tetramethylammonium hydroxide.

In some embodiments of the present disclosure, in step S3, a dosage of the graphite is 1% to 10% of a mass of the asphalt, preferably 3% to 7%, and more preferably 5%.

In some embodiments of the present disclosure, in step S3, the aggregate is selected from one or more of AC-9, AC-13, AC-16, AC-19, AC-26 or AC-31.

According to a preferred embodiment of the present disclosure, the present disclosure at least has the following beneficial effects.

1. According to the present disclosure, the current is applied to both ends of the electrode, and the binder PVDF generates a lot of heat at the interface between the binder and the electrode material due to poor conductivity. When the temperature reaches a melting temperature of the binder (172° C.), the binder will be melt into a liquid state and flow out from the current collector, so that the electrode material can be stripped off from the electrode plate. For the negative plate with graphite to be recycled, after stripping off the graphite from the negative material, a small amount of binder will remain on the graphite. In this case, At this time, the binder PVDF has been deactivated and hardened due to melting and re-curing, and the material can be crushed into fine particles by ball-milling, and then separated by winnowing using the density difference between the graphite and the binder to obtain the graphite with a higher purity. Compared with the loss of the graphite as a reducing agent in the traditional pyrogenic recycling and the graphite as a waste in hydrometallurgy recycling, this recycling method has the advantages of low energy consumption, high recycling rate of graphite and high purity, which can avoid the low utilization rate of the graphite in the traditional recycling process.

2. According to the present disclosure, the graphite is treated with alkali, which can neutralize —COOH on the surface of the graphite, retain —OH on the surface of the graphite, and keep a part of alkali between the graphite layers, so that the graphite is weakly alkaline, which can improve the interfacial bonding between the graphite and the asphalt, thus making the conductive asphalt more compact in structure, higher in compressive strength and longer in service life.

3. According to the present disclosure, the graphite is mixed into the asphalt. When the amount of graphite is small, the conductivity is poor, and the resistance of the asphalt is larger. With the increased content of the graphite material, the graphite forms a conductive network in the asphalt, and the conductivity of the asphalt is enhanced. The establishment of the conductive network can investigate cracks in a road through a current test, and can also heat a road surface by applying a current to the road surface to accelerate the melting of ice and snow. In addition, heating the road surface to about 70° C. will soften the asphalt, make the asphalt have certain fluidity, and fill the tiny cracks in the asphalt road to prolong the service life of the road.

BRIEF DESCRIPTION OF DRAWINGS

The present disclosure will be further explained with reference to the accompanying drawings and embodiments hereinafter, where.

DETAILED DESCRIPTION

The concepts and the technical effects produced of the present disclosure will be clearly and completely described in conjunction with the embodiments and the accompanying drawings so as to sufficiently understand the objects, the features and the effects of the present disclosure. Obviously, the described embodiments are merely some embodiments of the disclosure, rather than all the embodiments. Other embodiments obtained by those skilled in the art without going through any creative effort shall all fall within the protection scope of the disclosure.

Embodiment 1

Figure 1:
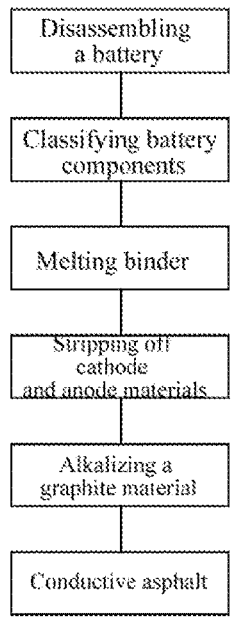
FIG. 1 is a process flowchart of Embodiment 1 of the present disclosure.

A method for recycling an electrode plate of a decommissioned battery, referring to FIG. 1, includes the following steps of:

(1) dismantling a battery after deep discharge, classifying a case, a positive plate, a diaphragm and a negative plate of the battery respectively by manual sorting, heating the positive plate and the negative plate to 180° C. by internal resistances of the electrode plates under the action of 12 V and an applied current of 1 A respectively, and keeping heating for 10 minutes, so that a positive material was separated from an aluminum foil, and a negative material (including graphite and a small amount of PVDF) was separated from a copper foil;

(2) transferring the exfoliated negative material to a ball mill for ball-milling at 200 r/min for 6 hours to obtain a ball-milled material with a particle size of 11 μm to 18 μm, pouring the ball-milled material into a horizontal winnower mill, and sorting the material at a rotating speed of 1,000 r/min, where the material close to the horizontal winnower mill was graphite and the material far from the horizontal winnower mill was PVDF; a purity of graphite obtained by this sorting method was over 98%, and a recycling rate of graphite was 95%;

(3) adding the graphite into 0.1 mol/L NaOH solution and soaking for 30 minutes, alkalizing functional groups on a surface of the graphite, and then washing and drying; and (4) heating purchased industrial asphalt at 170° C., adding graphite which accounts for 1% of a mass of the asphalt after the asphalt was softened, then adding an AC-9 aggregate, a dosage of the asphalt being 5% of a dosage of the aggregate, and uniformly mixing with a stirrer to obtain conductive asphalt.

Figure 2:
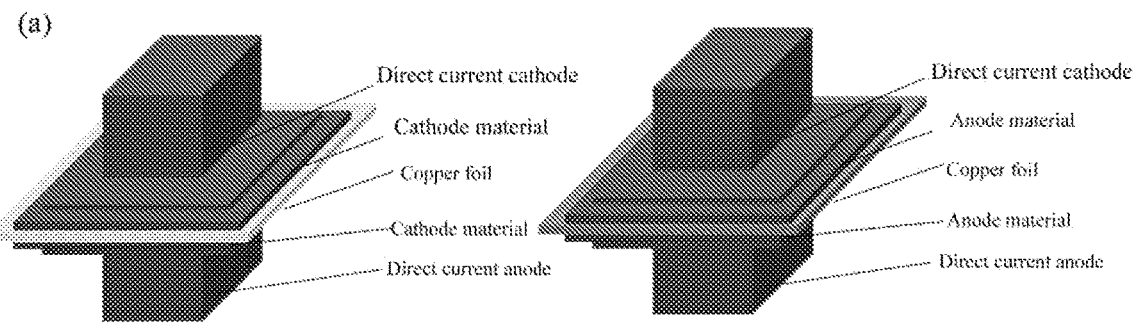
FIG. 2 is a schematic diagram showing two heating structures of a positive plate and a negative plate of the present disclosure.
Figure 2:
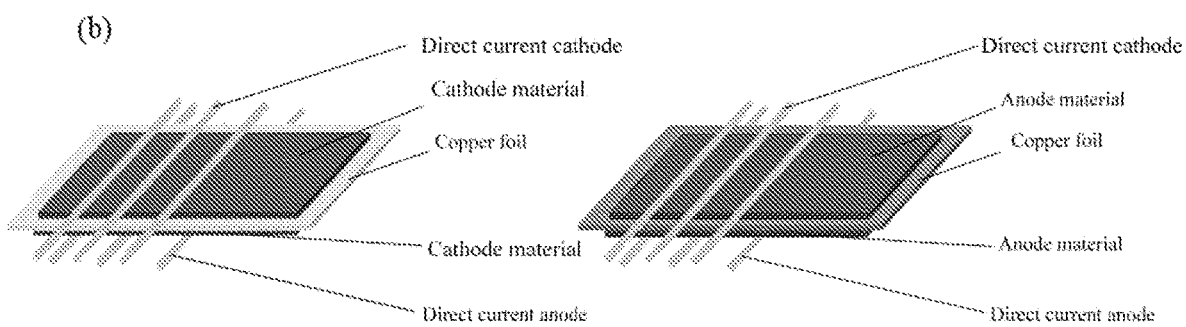

FIG. 2 is a schematic diagram showing two heating structures of positive and negative plates. In this figure, the upper and lower parts of FIG. a on the left are positive and negative plates of an external power supply. The positive and negative plates are in contact with the positive material, the aluminum foil is disposed between the positive materials. The upper and lower parts on the right are positive and negative plates of the external power supply. The positive and negative plates are in contact with the negative material, the copper foil is disposed between the negative materials. In this figure, FIG. b on the left shows a roller electrode. Upper and lower rollers are respectively connected with different electrodes respectively, the positive material and the aluminum foil are disposed between the rollers, the upper and lower rollers on the right are connected with different electrodes respectively, and the negative material and the copper foil are disposed between the rollers.

Embodiment 2

A method for recycling an electrode plate of a decommissioned battery includes the following steps of:
(1) dismantling a battery after deep discharge, classifying a case, a positive plate, a diaphragm and a negative plate of the battery respectively by manual sorting, heating the positive plate and the negative plate to 190° C. by internal resistances of the electrode plates under the action of 36 V and an applied current of 1 A respectively, and keeping heating for 10 minutes, so that a positive material was separated from an aluminum foil, and a negative material (including graphite and a small amount of PVDF) was separated from a copper foil;
(2) transferring the exfoliated negative material to a ball mill for ball-milling at 200 r/min for 6 hours to obtain a ball-milled material with a particle size of 11 μm to 18 μm, and separating the graphite from the PVDF by winnowing according to a density difference; a purity of graphite obtained by this sorting method was over 98%, and a recycling rate of graphite was 95%;
(3) adding the graphite into 0.2 mol/L NaOH solution and soaking for 30 minutes, alkalizing functional groups on a surface of the graphite, and then washing and drying; and
(4) heating purchased industrial asphalt at 170° C., adding graphite which accounts for 2% of a mass of the asphalt after the asphalt was softened, then adding an AC-13 aggregate, a dosage of the asphalt being 5% of a dosage of the aggregate, and uniformly mixing with a stirrer to obtain conductive asphalt.

Embodiment 3

A method for recycling an electrode plate of a decommissioned battery includes the following steps of:
(1) dismantling a battery after deep discharge, classifying a case, a positive plate, a diaphragm and a negative plate of the battery respectively by manual sorting, heating the positive plate and the negative plate to 200° ° C. by internal resistances of the electrode plates under the action of 36 V and an applied current of 5 A respectively, and keeping heating for 30 minutes, so that a positive material was separated from an aluminum foil, and a negative material (including graphite and a small amount of PVDF) was separated from a copper foil;
(2) transferring the exfoliated negative material to a ball mill for ball-milling at 200 r/min for 6 hours to obtain a ball-milled material with a particle size of 11 μm to 18 μm, and separating the graphite from the PVDF by winnowing according to a density difference; a purity of graphite obtained by this sorting method was over 98%, and a recycling rate of graphite was 95%;
(3) adding the graphite into 0.1 mol/L KOH solution and soaking for 30 minutes, alkalizing functional groups on a surface of the graphite, and then washing and drying; and
(4) heating purchased industrial asphalt at 170° ° C., adding graphite which accounts for 4% of a mass of the asphalt after the asphalt was softened, then adding an AC-16 aggregate, a dosage of the asphalt being 5% of a dosage of the aggregate, and uniformly mixing with a stirrer to obtain conductive asphalt.

Embodiment 4

A method for recycling an electrode plate of a decommissioned battery includes the following steps of:
(1) dismantling a battery after deep discharge, classifying a case, a positive plate, a diaphragm and a negative plate of the battery respectively by manual sorting, heating the positive plate and the negative plate to 220° ° C. by internal resistances of the electrode plates under the action of 36 V and an applied current of 1 A respectively, and keeping heating for 40 minutes, so that a positive material was separated from an aluminum foil, and a negative material (including graphite and a small amount of PVDF) was separated from a copper foil;
(2) transferring the exfoliated negative material to a ball mill for ball-milling at 200 r/min for 6 hours to obtain a ball-milled material with a particle size of 11 μm to 18 μm, and separating the graphite from the PVDF by winnowing according to a density difference; a purity of graphite obtained by this sorting method was over 98%, and a recycling rate of graphite was 95%;
(3) adding the graphite into 0.1 mol/L $NH_3 \cdot H_2O$ solution and soaking for 30 minutes, alkalizing functional groups on a surface of the graphite, and then washing and drying; and
(4) heating purchased industrial asphalt at 170° C., adding graphite which accounts for 5% of a mass of the asphalt after the asphalt was softened, then adding an AC-19 aggregate, a dosage of the asphalt being 5% of a dosage of the aggregate, and uniformly mixing with a stirrer to obtain conductive asphalt.

Embodiment 5

A method for recycling an electrode plate of a decommissioned battery includes the following steps of:
(1) dismantling a battery after deep discharge, classifying a case, a positive plate, a diaphragm and a negative plate of the battery respectively by manual sorting, heating the positive plate and the negative plate to 250° C. by internal resistances of the electrode plates under the action of 36 V and an applied current of 1 A respectively, and keeping heating for 10 minutes, so that a positive material was separated from an aluminum foil, and a negative material (including graphite and a small amount of PVDF) was separated from a copper foil;

(2) transferring the exfoliated negative material to a ball mill for ball-milling at 200 r/min for 6 hours to obtain a ball-milled material with a particle size of 11 μm to 18 μm, and separating the graphite from the PVDF by winnowing according to a density difference; a purity of graphite obtained by this sorting method was over 98%, and a recycling rate of graphite was 95%;

(3) adding the graphite into 0.1 mol/L tetramethylammonium hydroxide solution and soaking for 30 minutes, alkalizing functional groups on a surface of the graphite, and then washing and drying; and (4) heating purchased industrial asphalt at 170° ° C., adding graphite which accounts for 10% of a mass of the asphalt after the asphalt was softened, then adding an AC-31 aggregate, a dosage of the asphalt being 5% of a dosage of the aggregate, and uniformly mixing with a stirrer to obtain conductive asphalt.

Comparative Example 1

In this comparative example, an ordinary asphalt concrete was prepared, which was different from Embodiment 1 in that no graphite was added, and the specific process was as follows:

heating asphalt at 170° C., adding an AC-9 aggregate after the asphalt was softened, a dosage of the asphalt being 5% of a dosage of the aggregate, and uniformly mixing with a stirrer to obtain asphalt concrete.

Comparative Example 2

A method for recycling an electrode plate of a decommissioned battery was different from Embodiment 2 in that the alkali treatment of step (3) was not needed, and the specific process was as follows:

(1) dismantling a battery after deep discharge, classifying a case, a positive plate, a diaphragm and a negative plate of the battery respectively by manual sorting, heating the positive plate and the negative plate to 190° ° C. by internal resistances of the electrode plates under the action of 36 V and an applied current of 1 A respectively, and keeping heating for 10 minutes, so that a positive material was separated from an aluminum foil, and a negative material (including graphite and a small amount of PVDF) was separated from a copper foil;

(2) transferring the exfoliated negative material to a ball mill for ball-milling at 200 r/min for 6 hours to obtain a ball-milled material with a particle size of 11 μm to 18 μm, and separating the graphite from the PVDF by winnowing according to a density difference; a purity of graphite obtained by this sorting method was over 98%, and a recycling rate of graphite was 95%; and (3) heating purchased industrial asphalt at 170° ° C., adding graphite which accounts for 10% of a mass of the asphalt after the asphalt was softened, then adding an AC-13 aggregate, a dosage of the asphalt being 5% of a dosage of the aggregate, and uniformly mixing with a stirrer to obtain conductive asphalt.

Experimental Example

1. Resistivity Test:

(1) The conductive asphalt prepared in Embodiments 1 to 5 and Comparative Example 1 was made into Marshall specimens with a diameter of 101.6 mm×63.5 mm, and resistivities of the prepared Marshall specimens were tested by a two-electrode method. A volt ampere characteristic curve was measured by Keithley-2450 SourceMeter, and a scanning voltage ranged from 0 V to 5 V. The results were shown in Table 1.

TABLE 1

Test results of asphalt resistivity

| | Comparative Example 1 | Embodiment 1 | Embodiment 2 | Embodiment 3 | Embodiment 4 | Embodiment 5 |
| --- | --- | --- | --- | --- | --- | --- |
| Resistivity ($\Omega \cdot m$) | $3.2 \times 10^9$ | $0.97 \times 10^8$ | $6.2 \times 10^7$ | 89 | 28 | 21 |

Figure 3:
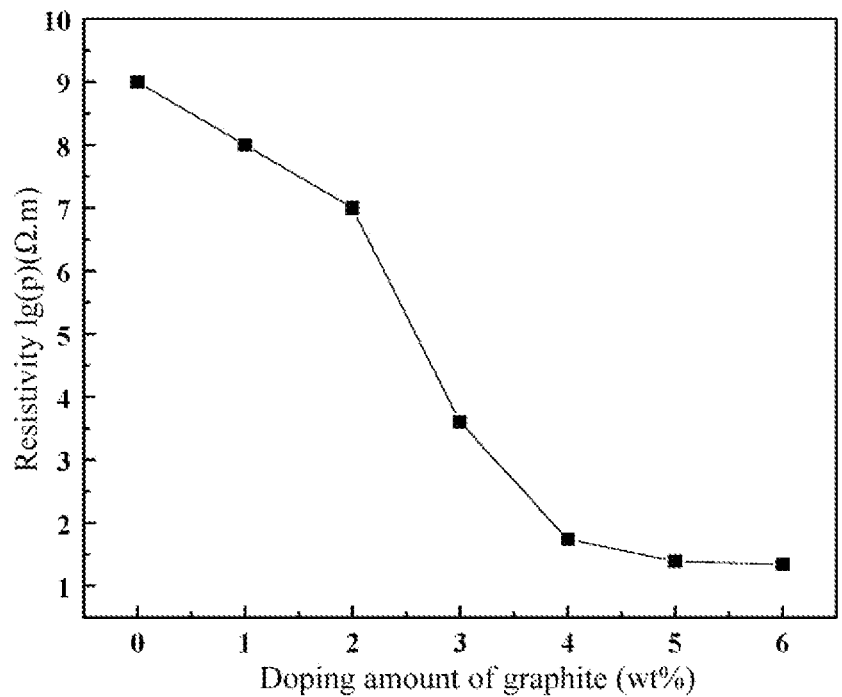
FIG. 3 is a diagram showing a relationship between a doping amount of graphite and a conductive performance of conductive asphalt in Embodiment 1 of the present disclosure.

(2) On the basis of Embodiment 1, a doping amount of the graphite in step (4) was adjusted to 0 wt % to 6 wt %, and the test result of the resistivity thereof was shown in FIG. 3. It can be seen from FIG. 3 that the higher the doping amount of the graphite is, the lower the resistivity is, indicating that with the increased content of the graphite, the graphite forms a conductive network in the asphalt, and the conductivity of the asphalt is enhanced.

2. Test on Ice and Snow Melting:

(1) The conductive asphalt was made into specimens of 150 mm×50 mm×20 mm, a plurality of 10 ml of pure water was respectively taken to prepare ice cubes at a low temperature of −10° C.±1° C., put ice cubes of uniform size and equal mass on the test specimens of Embodiments 1 to 5 and Comparative Example 1 in a thermotank of 0° C., and then a voltage of 36 V and a current of 5 A are applied to both sides of the specimens for test on ice and snow melting. The results were shown in Table 2.

TABLE 2

Test results on ice and snow melting of asphalt

| | Comparative Example 1 | Embodiment 1 | Embodiment 2 | Embodiment 3 | Embodiment 4 | Embodiment 5 |
|---|---|---|---|---|---|---|
| Melting time (h) | >10 | >10 | 9 | 1.4 | 2 | 2.4 |

Figure 4:
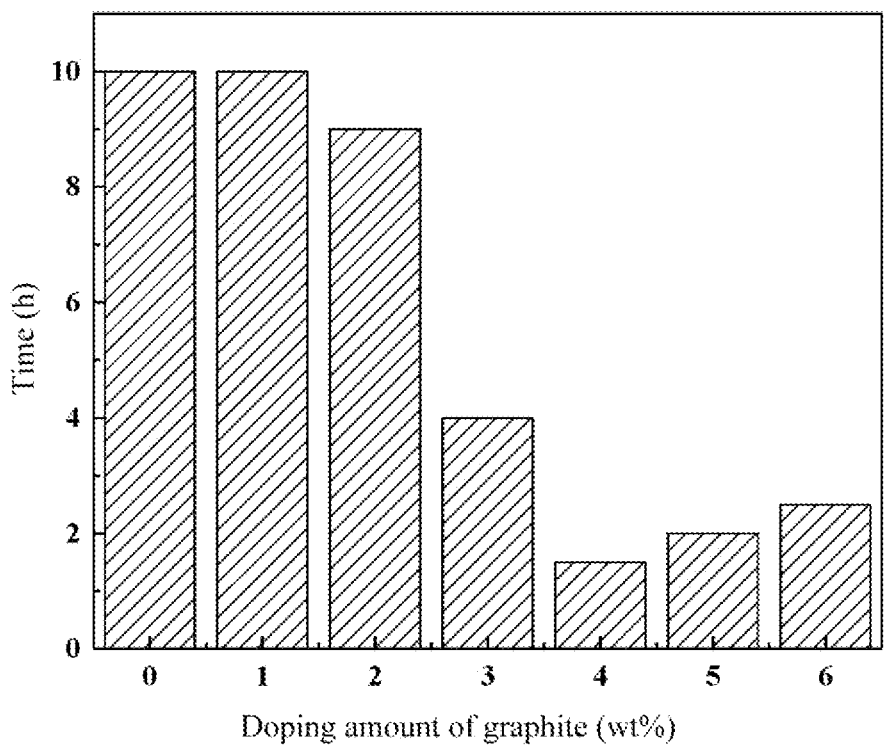
FIG. 4 is a diagram showing a relationship between the doping amount of the graphite and a melting time of ice and snow in Embodiment 1 of the present disclosure.

(2) On the basis of Embodiment 1, a doping amount of the graphite in step (4) was adjusted to 0 wt % to 6 wt %, and the test result of the ice and snow melting thereof was shown in FIG. 4. It can be seen from FIG. 4 that with the increased content of the graphite, the melting time of ice and snow becomes shorter. When the doping amount reaches 4 wt %, the thawing time is shortest. After that, with the increased content of the graphite, the melting time increases somewhat. This is because that, according to the calculation based on the formula $Q=I^2Rt$, when the doping amount of the graphite is small, the conductive asphalt cannot form an effective conductive network, resulting in high resistance and no effective internal current, leading to low heat generation, and conversely, when the amount of graphite is excessive, the resistance is low and the current is high. Therefore, when the doping amount of the graphite is moderate, the heat yield is maximum.

3. Compressive Strength Test

The conductive asphalt prepared in Embodiments 1 to 5 and Comparative Example 2 was tested for compressive strength by a compressive strength tester, with a compression speed of 12 mm/min and a contact area of 140 cm². Table 3 showed the pH and compressive strength test results of Embodiments 1 to 5 and Comparative Example 2 after alkali treatment.

TABLE 3 pH and compressive strength test results after alkali treatment

| | Comparative Example 2 | Embodiment 1 | Embodiment 2 | Embodiment 3 | Embodiment 4 | Embodiment 5 |
|---|---|---|---|---|---|---|
| pH | 6.3 | 7.9 | 8.3 | 8.1 | 7.6 | 8.6 |
| Ultimate compressive strength (Mpa) | 25.8 | 27.4 | 28.2 | 27.8 | 27.1 | 26.7 |

The embodiments of the present disclosure are described in detail with reference to the drawings above, but the present disclosure is not limited to the above embodiments, and various changes may also be made within the knowledge scope of those of ordinary skills in the art without departing from the purpose of the present disclosure. In addition, in case of no conflict, the embodiments in the application and the features in the embodiments may be combined with each other.

The invention claimed is:

1. A method for recycling an electrode plate of a decommissioned battery, comprising:
    S1: disassembling a decommissioned battery to obtain the electrode plate, electrifying both ends of the electrode plate until a binder on the electrode plate is heated and melted, and then separating out an electrode material and a current collector;
    S2: when the electrode plate is a negative plate, ball-milling the electrode material, performing winnowing on a ball-milled material to obtain graphite, and subjecting the graphite to alkali treatment; and
    S3: adding the graphite after the alkali treatment in step S2 and an aggregate into a softened asphalt, and stirring a resulting material to obtain a conductive asphalt.

2. The method according to claim 1, wherein in step S1, when the electrode plate is a positive plate, the electrode material is one of lithium nickel cobalt manganese oxide, lithium iron phosphate, lithium cobalt oxide or lithium manganate.

3. The method according to claim 1, wherein in step S1, a power supply for the electrifying has a voltage of 12 V to 72 V and a current of 1 A to 5 A.

4. The method according to claim 3, wherein in step S1, the electrifying lasts for 10 minutes to 60 minutes.

5. The method according to claim 1, wherein in step S1, the binder on the electrode plate is heated and melted at a temperature ranging from 180° C. to 250° C.

6. The method according to claim 1, wherein in step S1, the electrifying lasts for 10 minutes to 60 minutes.

7. The method according to claim 1, wherein in step S2, the alkali used for the alkali treatment has a concentration of 0.1 mol/L to 1 mol/L.

8. The method according to claim 7, wherein in step S2, the alkali used for the alkali treatment is one or more of sodium hydroxide, potassium hydroxide, aqueous ammonia, quaternary ammonium hydroxide or tetramethylammonium hydroxide.

9. The method according to claim 1, wherein in step S2, the ball-milled material has a particle size of 11 μm to 18 μm.

10. The method according to claim 1, wherein in step S2, the alkali used for the alkali treatment is one or more of sodium hydroxide, potassium hydroxide, aqueous ammonia, quaternary ammonium hydroxide or tetramethylammonium hydroxide.

11. The method according to claim 1, wherein in step S3, a dosage of the graphite is 1% to 10% of a mass of the asphalt.

12. The method according to claim 1, wherein in step S3, the aggregate is selected from one or more of AC-9, AC-13, AC-16, AC-19, AC-26 or AC-31.

* * * * *